US007974509B2

(12) United States Patent
Smith et al.

(10) Patent No.: US 7,974,509 B2
(45) Date of Patent: Jul. 5, 2011

(54) TELECOMMUNICATION RACK UNIT TRAY

(75) Inventors: Trevor D. Smith, Eden Prairie, MN (US); Thomas LeBlanc, Fitchburg, MA (US); Oscar Fernando Bran de Leon, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/924,912

(22) Filed: Oct. 6, 2010

(65) Prior Publication Data

US 2011/0097053 A1 Apr. 28, 2011

Related U.S. Application Data

(63) Continuation of application No. 12/381,163, filed on Mar. 6, 2009, now Pat. No. 7,813,612, which is a continuation of application No. 11/716,392, filed on Mar. 9, 2007, now Pat. No. 7,509,016.

(51) Int. Cl.
*G02B 6/00* (2006.01)

(52) U.S. Cl. ........................................ 385/135; 385/134

(58) Field of Classification Search .................. 385/134, 385/135

See application file for complete search history.

(56) References Cited

U.S. PATENT DOCUMENTS

| | | | |
|---|---|---|---|
| 5,066,149 | A | 11/1991 | Wheeler et al. |
| 5,511,144 | A | 4/1996 | Hawkins et al. |
| 5,519,804 | A | 5/1996 | Burek et al. |
| 5,978,540 | A | 11/1999 | Bechamps et al. |
| 6,438,310 | B1 | 8/2002 | Lance et al. |
| 6,504,988 | B1 | 1/2003 | Trebesch et al. |
| 6,715,619 | B2 | 4/2004 | Kim et al. |
| 6,865,331 | B2 | 3/2005 | Mertesdorf |
| 7,079,744 | B2 | 7/2006 | Douglas et al. |
| 7,302,154 | B2 | 11/2007 | Trebesch et al. |
| 7,373,071 | B2 | 5/2008 | Douglas et al. |
| 7,509,016 | B2 | 3/2009 | Smith et al. |
| 7,570,860 | B2 | 8/2009 | Smrha et al. |
| 7,570,861 | B2 | 8/2009 | Smrha et al. |
| 7,813,612 | B2 | 10/2010 | Smith et al. |
| 2003/0007767 | A1 | 1/2003 | Douglas et al. |
| 2004/0086252 | A1 | 5/2004 | Smith et al. |
| 2004/0161217 | A1 | 8/2004 | Hodge et al. |
| 2005/0002633 | A1 | 1/2005 | Solheid et al. |
| 2005/0025444 | A1 | 2/2005 | Barnes et al. |
| 2005/0100301 | A1 | 5/2005 | Solheid et al. |
| 2005/0111809 | A1 | 5/2005 | Giraud et al. |
| 2006/0275008 | A1 | 12/2006 | Xin |
| 2007/0031099 | A1 | 2/2007 | Herzog et al. |
| 2007/0201806 | A1 | 8/2007 | Douglas et al. |
| 2008/0175551 | A1 | 7/2008 | Smrha et al. |

OTHER PUBLICATIONS

Zimmel et al., U.S. Appl. No. 11/354,297, filed Feb. 13, 2006; Fiber Optic Splitter Module.

*Primary Examiner* — Rhonda S Peace
(74) *Attorney, Agent, or Firm* — Merchant & Gould P.C.

(57) ABSTRACT

An interface panel that mounts to a telecommunications rack. The interface panel including a splicing arrangement and a splitter module. The interface panel further including a fixed tray to which each of the splicing arrangement and the splitter module mounts. The splicing arrangement and the splitter module each having a sliding mounting arrangement that provides access to the functional splicing and splitting components.

10 Claims, 4 Drawing Sheets

40
28
78
34
82
52
34
78
28
86
20
86
32
24
42
42
22
36
36
38
42
42

12
28
30
38
78

44
52
52
52
52
68
72
42
74
70
42
88
42
42
24
24
76
20
58
24
66
60
62
64
56

TELECOMMUNICATION RACK UNIT TRAY

CROSS-REFERENCE TO RELATED APPLICATIONS

This application is a continuation of U.S. application Ser. No. 12/381,163, filed Mar. 6, 2009, now U.S. Pat. No. 7,813,612; which is a continuation of U.S. application Ser. No. 11/716,392, filed Mar. 9, 2007, now U.S. Pat. No. 7,509,016; which applications are incorporated herein by reference.

TECHNICAL FIELD

This disclosure relates to devices for use in the telecommunications industry, and associated methods. More specifically, this disclosure relates to fiber optic splicing and splitting components, and arrangements of such components.

BACKGROUND

Many local area networks and telecommunication systems utilize telecommunications racks having termination panels that provide cross-connections between telecommunications equipment. Demand for greater telecommunication services has prompted the need to increase the functionality of the various rack mounted arrangements; yet, low-cost solutions including the increased functionality are also desirable.

Improvement in devices and arrangements that provide greater functionality while minimizing costs is needed.

SUMMARY

One aspect of the present disclosure relates to a telecommunications system including an interface panel that mounts to a telecommunications rack. The interface panel includes a splicing arrangement and at least one splitter module. Another aspect of the present disclosure relates to an interface panel having a fixed tray. The functional splicing and splitting components mounted on the fixed tray are slidably mounted to provide access to the functional components when the tray is mounted to a telecommunications rack.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
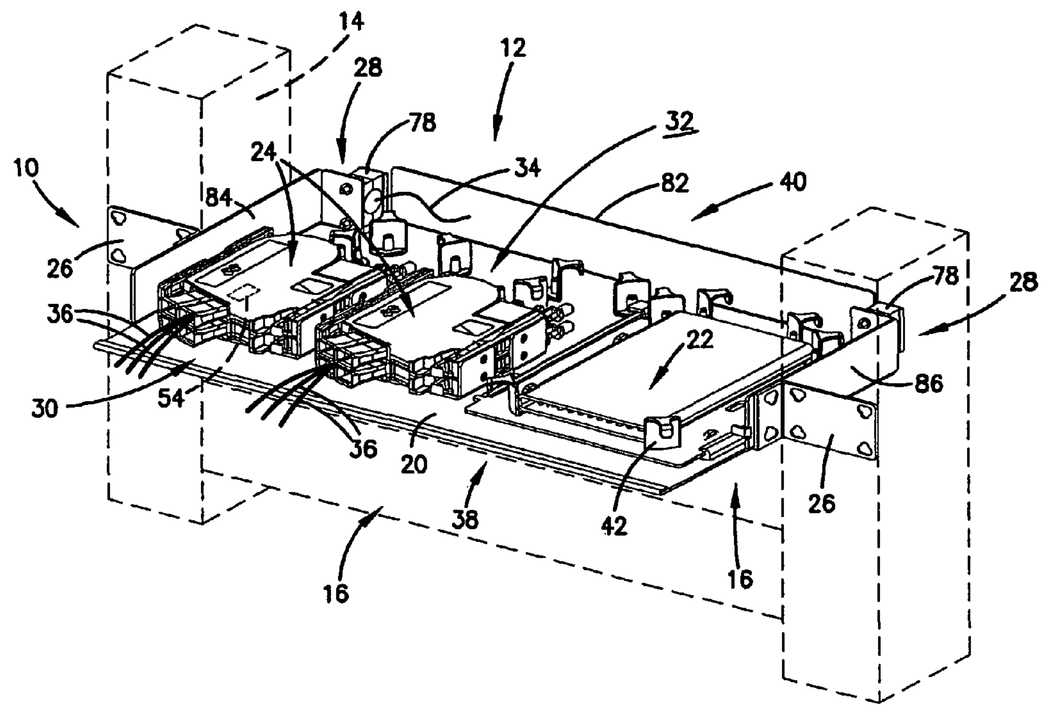
FIG. 1 is a front perspective view of one embodiment of telecommunications system including an interface panel in accordance with the principles disclosed.
Figure 2:
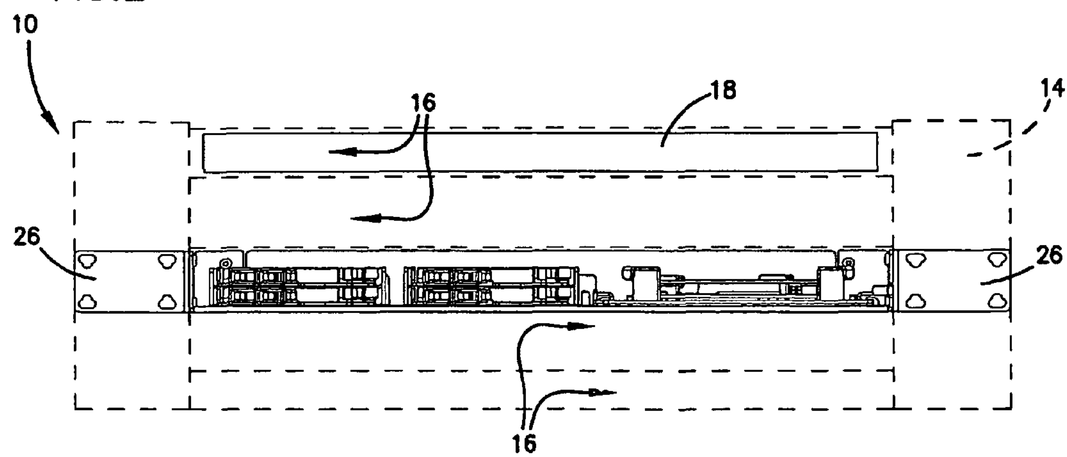
FIG. 2 is a front elevation view of the system of FIG. 1.

FIGS. 1 and 2 illustrate one embodiment of a telecommunications system 10 including an interface panel 12 in accordance with the principles disclosed. The telecommunications system 10 includes at least one telecommunications rack 14 (schematically represented). The rack 14 defines a plurality of rack unit spaces 16. Telecommunications equipment 18 (schematically represented in FIG. 2), such as adapter panels, for example, mount to the rack 14 within the rack unit spaces 16.

The interface panel 12 of the present disclosure also mounts within a selected one of the number of rack unit spaces 16 of the telecommunications rack 14. The interface panel 12 is mounted to the telecommunications rack 14 by mounting brackets 26 located at the sides of the interface panel. When mounted to the rack, the interface panel 12 is in a generally horizontal orientation.

Preferably, the interface panel 12 has a height H (FIG. 2) that occupies only a single rack unit (one RU) of the telecommunications rack 14. In the illustrated embodiment, the height H of the interface panel 12 is approximately 1.25 inches.

Figure 4:
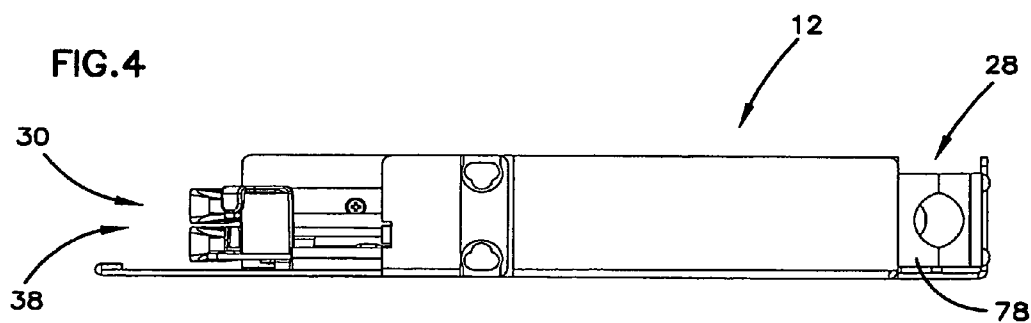
FIG. 4 is a side elevation view of the interface panel of FIG. 1.

The interface panel 12 defines a cable entry 28 and a cable exit 30. Incoming cables 34 enter into an interior region 32 of the interface panel 12 through the cable entry 28. Outgoing cables 36 exit the interior region 32 of the panel 12 through the cable exit 30. The interface panel 12 defines a front 38 and a rear 40. In the illustrated embodiment, two cable entries 28 are located at the rear 40 of the interface panel 12; the cable exit 42 is located at the front 38 of the interface panel. In one embodiment, the cable exit 42 at the front 38 is defined by a front opening 80 (FIG. 4) of the interface panel. In alternative embodiments, a front panel can be provided—the cable exit then being provided at one or both of the sides of the panel adjacent to the front panel.

Figure 3:
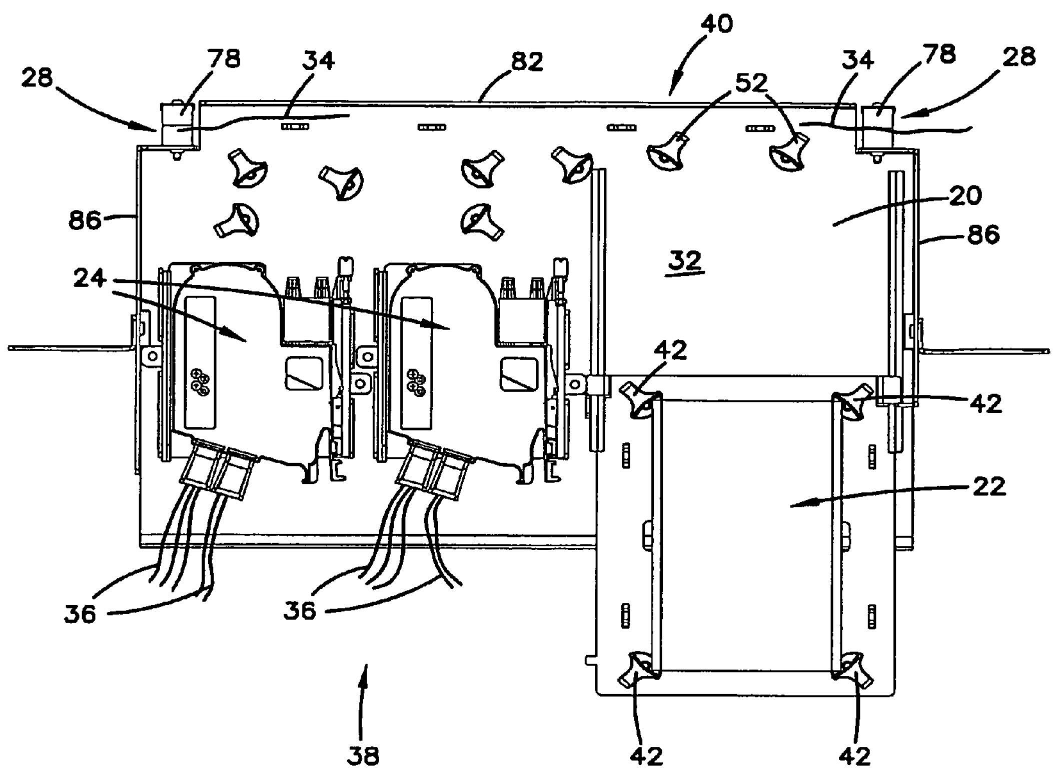
FIG. 3 is top plan view of the interface panel of FIG. 1, shown in isolation.

Referring now to FIGS. 1 and 3, the interface panel 12 is generally defined by a tray 20. The tray 20 can include a rear wall 82 and opposing side walls 84, 86. A splicing arrangement 22 and at least one splitter module 24 are each mounted to the tray 20. In use, the incoming cable 34 enters the interface panel 12 through one of the cable entries 28 and is routed to the splicing arrangement 22. A clamp 78 located at the cable entry 28 can be used to secure the incoming cable 34 relative to the panel 12. Excess incoming cable slack can be wrapped around radius limiters 42 (FIG. 3) of the splicing arrangement 22 and/or wrapped around radius limiters 52 mounted on the tray 20.

Figure 5:
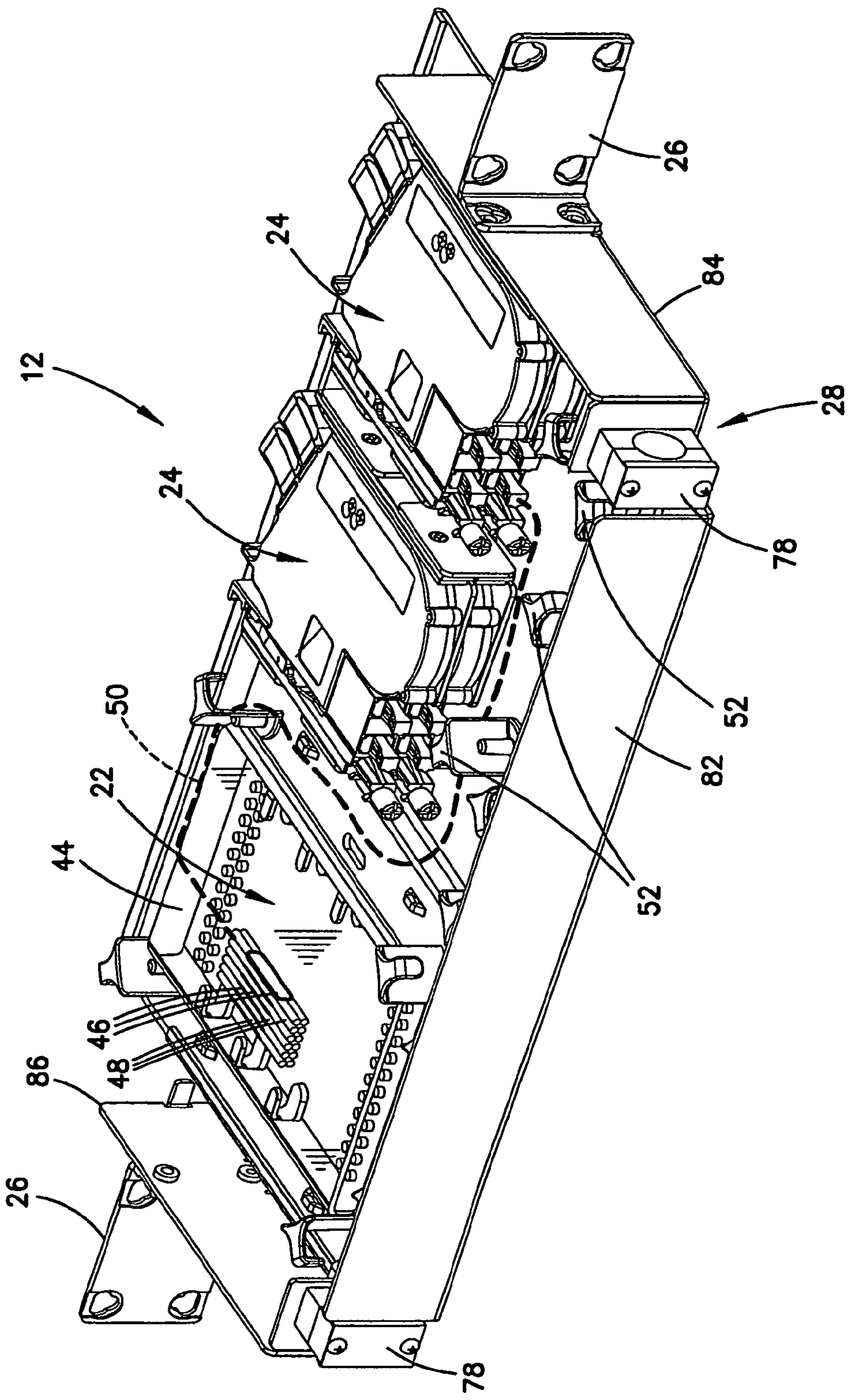
FIG. 5 is a rear perspective view of the interface panel of FIG. 1.
Figure 6:
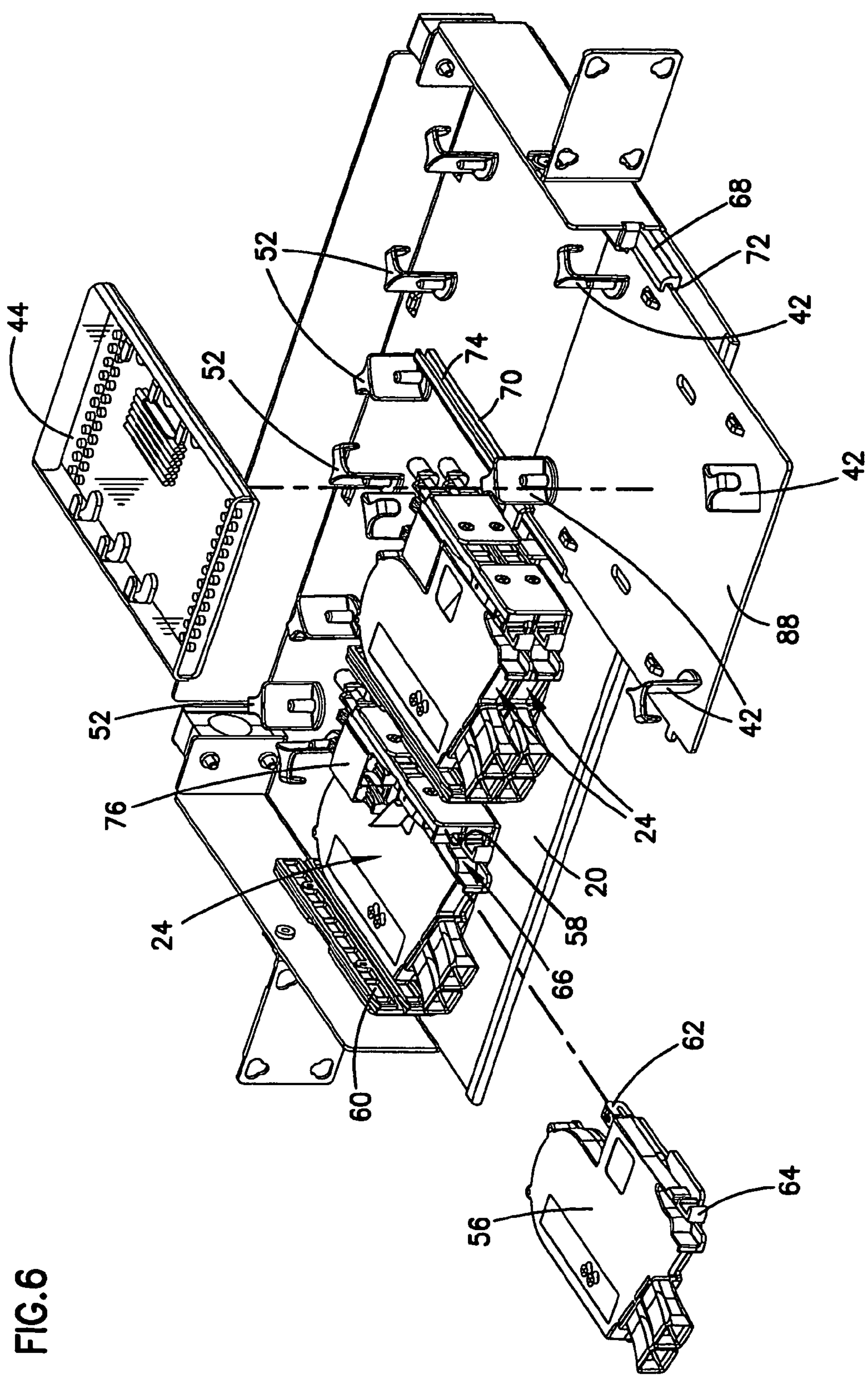
FIG. 6 is a partially exploded front perspective view of the interface panel of FIG. 5.

Referring now to FIGS. 5 and 6, the splicing arrangement 22 generally includes a splice tray 44 having splice-holding channels 46 that receive cable splices 48. At the splicing arrangement 22, the incoming cable 34 is spliced to provide a connectorized cable connection between the splicing arrangement 22 and the splitter module 24. The connectorized cable connection, i.e., the now spliced cable 50, is routed from the splicing arrangement 22 to the splitter module 24 (schematically represented in FIG. 5).

The now spliced cable 50 exits the splice tray 44 of the splicing arrangement 22 and is routed from the splicing arrangement 22 to the splitter module 24. Excess spliced cable slack extending between the splicing arrangement 22 and the splitter module 24 can be wrapped around the radius limiters 52 mounted on the tray 20.

In the illustrated embodiment, four splitter modules 24 are shown, however, a greater number or lesser number of splitter modules can be provided. At the splitter module 24, the spliced cable 50 is split into the plurality of split outgoing cables 36 (FIG. 1). From the splitter module 24, the split outgoing cables 36 can be routed out the cable exit 30 and to desired termination locations, as required by the particular application.

Referring now to FIG. 6, each of the splitter modules 24 of the present interface panel 12 generally includes a splitter adapter 76 that connects to a cable housing portion 56. A splitter device 54 (schematically represented by dashed lines in FIG. 1) is located within the cable housing portion 56 of the module 24. The cable housing portion 56 also contains the split outgoing cables 36. Further details of a splitter module that can be used in the present interface panel 10 are described in U.S. patent application Ser. No. 11/354,297; which application is incorporated herein by reference.

In the illustrated embodiment, the cable housing portion 56 of the splitter modules 24 each slide independent of one another, and relative to the tray 20 of the interface panel 12. In particular, the cable housing portion 56 of each splitter module 24 slides within first and second housing guides 58, 60. The cable housing portion 56 includes a rear connection 62 that interconnects to the splitter adapter 76 of the module 24. During installation, for example, the cable housing portion 56 slides in a rearward direction within the housing guides 58, 60 until the rear connection 62 of the cable housing portion connects to the splitter adapter 76.

When the cable housing portion 56 of the module 24 is fully seated within the housing guides 58, 60, a latch 64 located on the cable housing portion 56 engages corresponding latch structure 66 of the first housing guide 58 to secure the cable housing portion 56 in relation to the splitter adapter 76. To remove the cable housing portion 78 for repair or replacement, for example, the latch 64 is unlatched from the latch structure 66 of the first guide 58 and the housing portion removed.

In one embodiment, the splitter module 24 is incorporated into the interface panel 10 as a factory-assembled unit so that the user need only mount the splitter module to the tray 20 without the need for splicing, for example. In particular, the splitter module 14 can be pre-assembled with the split outgoing cables 36 and connectors (not shown) so that a user need only secure the splitter module 24 to the tray 20, and route the outgoing cables 36 to the desired termination location.

Referring back to FIG. 3, each of the splicing arrangement 24 and the splitter modules 24 of the interface panel 12 are horizontally oriented so that the overall height H of the panel does not exceed the preferred one RU spatial limitation of the panel 12. This arrangement is compact yet provides the functionality of splicing and splitting in a single RU panel.

The tray 20 of the present interface panel 12 is fixed or fixedly mounted in relation to the telecommunications rack 14. What is meant by fixed or fixedly mounted is that the tray 20 does not move, slide, or translate relative to the telecommunications rack 14. Because the interface panel 12 is fixed, access to the functional components (e.g., the splicing arrangement 22 and the splitter modules 24) mounted to the fixed tray 20 is of importance.

The functional components of the interface panel 12 are constructed to slide relative to the tray 20 and relative to the telecommunications rack 14 to provide access to the components. In particular, as previously described, the cable housing portions 56 of the splitter modules 24 each individually slide in a forward-rearward direction relative to the tray 20. The sliding mounting arrangement of the present splitter modules 24 provide assess to the splitter devices 54 and the outgoing split cables 36 of the modules 24 when top access is otherwise obstructed; for example, when telecommunications equipment 18 is mounted in a rack unit above the interface panel 12.

Likewise, the splice tray 44 of the splicing arrangement 22 is constructed to slide relative to the tray 20 and relative to the telecommunications rack 14. In particular, the splice tray 44 is constructed to slide in a forward-rearward direction directed by first and second splice tray guides 68, 70. In the illustrated embodiment, the splice tray 44 is mounted to a sliding plate 88 that slides within grooves 72, 74 formed in the guides 68, 70. The sliding plate 88 and spice tray 44 provide access to the splices 48, for example, when telecommunications equipment 18 is mounted in the rack unit space above the interface panel 12. In one embodiment, the radius limiters 42 of the splicing arrangement 22 are arranged on the plate 88 so that the excess cable stored around the radius limiters 42 moves with the splice tray 44.

In general, the present interface panel 12 is a low-cost solution for telecommunications systems that can be enhanced by the provision of a panel having both splicing functionality and splitting functionality. The low-cost solution is provided in part by the fixed tray design that is simple to manufacture and simple to assembly. In contrast, some conventional panels including sliding drawers wherein the entire drawer slide relative to the telecommunications rack. Such sliding drawer assemblies can be costly to manufacture. The fixed tray eliminates the costs associated with such drawer slide assemblies; yet, the present interface panel 12 still provides access to the functional components (e.g., the splicing arrangement 22 and the splitter modules 24). Access is provided by allowing the functional components to slide outward from the interior region 32 of the panel 12, as opposed to sliding the entire tray outward from the rack.

The above specification provides a complete description of the present invention. Since many embodiments of the invention can be made without departing from the spirit and scope of the invention, certain aspects of the invention reside in the claims hereinafter appended.

What is claimed is:

1. A method of accessing components of an interface panel of a telecommunications system, the method comprising the steps of:

a) providing a telecommunications rack defining a plurality of rack unit spaces, the interface panel being mounted in a generally horizontal orientation within one of the rack unit spaces;

b) sliding a splitter module mounted on a non-moving mounting surface of the interface panel in a linear direction toward a front of the interface panel to access the splitter module; and c) sliding a splice arrangement mounted on the non-moving mounting surface of the interface panel relative to the splitter module in a linear direction toward a front of the interface panel to access the splice arrangement.

2. The method of claim 1, wherein the interface panel defines a cable entry and a cable exit, further including providing an incoming cable that enters the interface panel through the cable entry and a plurality of outgoing cables that exit the interface panel through the cable exit, the plurality of outgoing cables being split cables of the incoming cable.

3. The method of claim 2, wherein the interface panel has a front and a rear, the cable entry being located at the rear of the interface panel.

4. The method of claim 3, wherein the cable exit is located at the front of the interface panel.

5. The method of claim 1, wherein the sliding the splitter module and sliding the splice arrangement provide access to the splitter module and splice arrangement when telecommunications equipment is mounted in a rack unit space above the interface panel.

6. The method of claim 1, wherein the splice arrangement includes a splice tray having splice-holding channels that receive cable splices.

7. The method of claim 6, wherein the splice arrangement includes a sliding plate, the splice tray being mounted to the sliding plate.

8. The method of claim 1, wherein the step of sliding the splitter module and sliding the splice arrangement includes sliding the splitter module and splice arrangement within guides provided on the non-moving mounting surface of the interface panel.

9. The method of claim 8, further including unlatching the splitter module from latch structure provided on the one of the guides prior to sliding the splitter module in the linear direction toward the front of the interface panel.

10. The method of claim 1, wherein the splitter module includes a cable housing portion having a rear connection that connects to a splitter adapter, the cable housing portion and the rear connection separating from the splitter adapter when the splitter module slides in the linear direction toward the front of the interface panel.

* * * * *